June 28, 1927.　　　　M. F. CARR　　　　1,634,230
FASTENER STUD
Filed Aug. 25, 1925
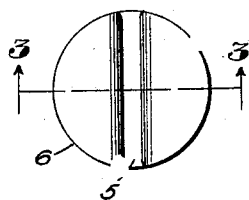
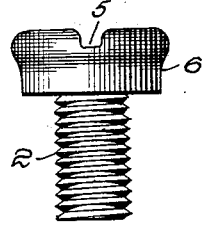 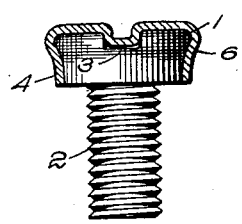
Inventor:
Moses F. Carr,
by Emery Booth Janney Varney
Attys Patented June 28, 1927.

1,634,230

UNITED STATES PATENT OFFICE.

MOSES F. CARR, OF LEXINGTON, MASSACHUSETTS, ASSIGNOR TO CARR FASTENER COMPANY, OF CAMBRIDGE, MASSACHUSETTS, A CORPORATION OF MAINE.

FASTENER STUD.

Application filed August 25, 1925. Serial No. 52,323.

This invention aims to provide an improved fastener stud for use in connection with stud and socket fasteners.

In the drawings, which illustrate a preferred embodiment of my invention:—

Figure 1 is a plan view of the stud;

Fig. 2 is a side elevation of the stud;

Fig. 3 is a section on the line 3—3 of Fig. 1, being partly in elevation; and

Fig. 4 is a sectional view of the cap member before attachment to the head of the body part.

Referring to the drawings, I have shown a fastener stud which includes a body part preferably formed of steel for strength and durability, and a cap part formed of some nonrustable metal for covering the part of the body part. Otherwise the body part would be exposed to the weather and become rusted when secured to a floor, automobile body or the like for cooperative engagement with a socket.

The body part has a head 1 and a threaded shank portion 2 for securing the body part to its support. The head presents a flat top face presenting the usual slot 3 for reception of a blade of a screw driver or other suitable tool. The peripheral wall of the head is tapered from the top inwardly toward the bottom for purposes more fully hereinafter described.

The cap, as illustrated in Fig. 4, is pressed from a relatively thin piece of metal and has a wall 4 perpendicular with its upper face and presents a depressed portion 5 for engagement in the slot 3.

In assembling the cap with the head 1 of the body part, the depressed portion 5 is first registered in the slot 3 and the wall 4 is then crimped or rolled against the peripheral wall of the head to conform therewith. Thus, as illustrated in Fig. 3, the cap fits closely to the general shape of the head 1 at its top face and side wall. The cap does not pass beneath the head, but relies entirely on the shape of the head for its assembly therewith.

When completely assembled, the cap is so shaped that a neck 6 is formed therein for engagement with the resilient stud-engaging means of a suitable socket. Rotation of the cap relative to the body part is prevented by the interengaging portions thereof, and the depressed portion 5 of the cap presents a tool-receiving slot for reception of a tool whereby the stud may be secured to its support.

While I have shown and described a preferred embodiment of my invention, it will be understood that I have done so for purposes of clarification rather than limitation, my invention being best defined in the following claims.

Claims:

1. A separable fastener stud comprising, in combination, a body part having a head portion and a threaded portion extending therefrom, and an imperforate cap part conforming with the peripheral wall and top of the head and held in assembled relation with the head by the peculiar shape thereof.

2. A separable fastener stud comprising, in combination, a body part having a slotted head, a threaded shank portion extending from said head and a cap part pressed inwardly to engage the slot in said head, said cap part conforming with the top and the peripheral wall of the head and held in assembled relation with said head by conformation with the peripheral wall of said head.

3. A separable fastener stud comprising, in combination, a body part having a head larger at the top than at the bottom, a cap part closely fitting the top face and tapered peripheral wall of said head and presenting a depressed portion fitting into a slot in said head thereby to receive a tool and a threaded shank portion extending from said head for securing said stud to a suitable support.

4. A separable fastener stud comprising, in combination, a body part having a head portion presenting a generally tapered peripheral wall larger at the top than at the bottom and a cap part completely covering the top and peripheral wall of the head of the stud and conforming with the contour thereof to maintain engagement therewith, said cap part presenting a stud head and neck for engagement with the resilient stud-engaging means of a socket.

5. A separable fastener stud comprising, in combination, a body part having a head portion presenting a generally tapered peripheral wall larger at the top than at the bottom and a cap part completely covering the top and peripheral wall of the head of the stud and conforming with the contour thereof to maintain engagement therewith and to provide a stud head and neck for engagement with the resilient stud-engaging means of a socket, and a depressed portion in the top of said cap for engagement with a slot in the upper face of said head to receive a tool for rotating the whole as a unit to turn a screw thread portion, extending from said head, into a stud support.

In testimony whereof, I have signed my name to this specification.

MOSES F. CARR.